(No Model.)
J. A. BOUK & C. R. BUSHNELL.
DEVICE FOR SAVING VALUABLE AND PRECIOUS METALS.
No. 544,880. Patented Aug. 20, 1895.
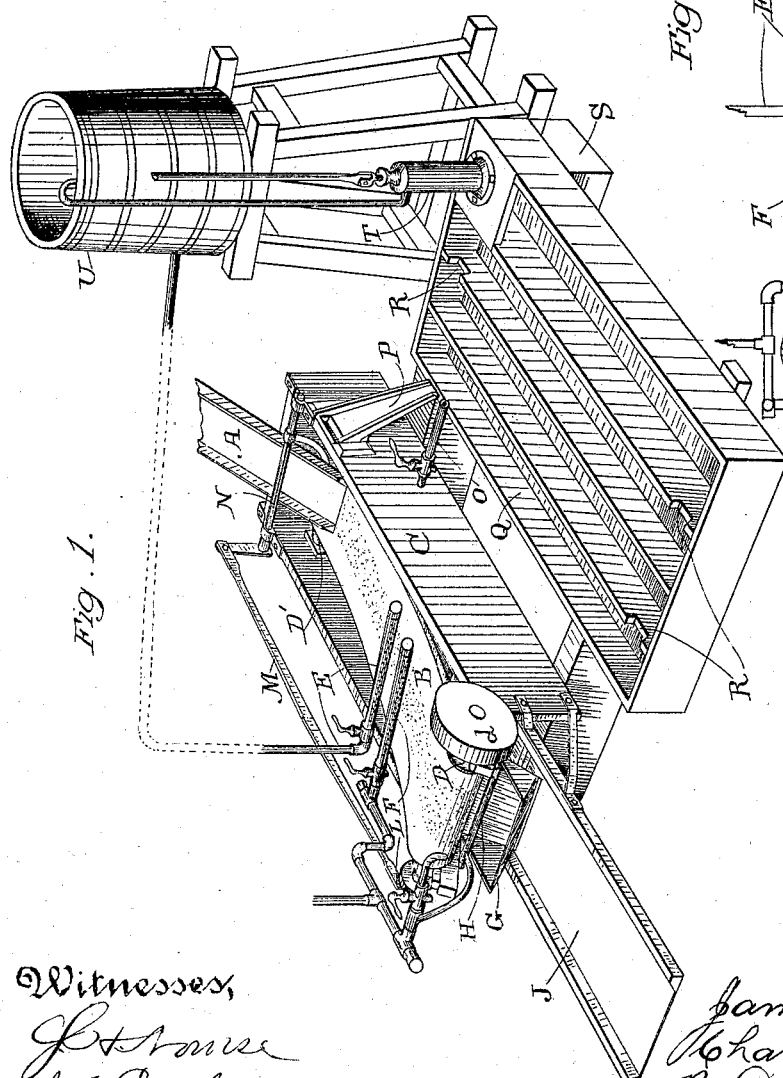
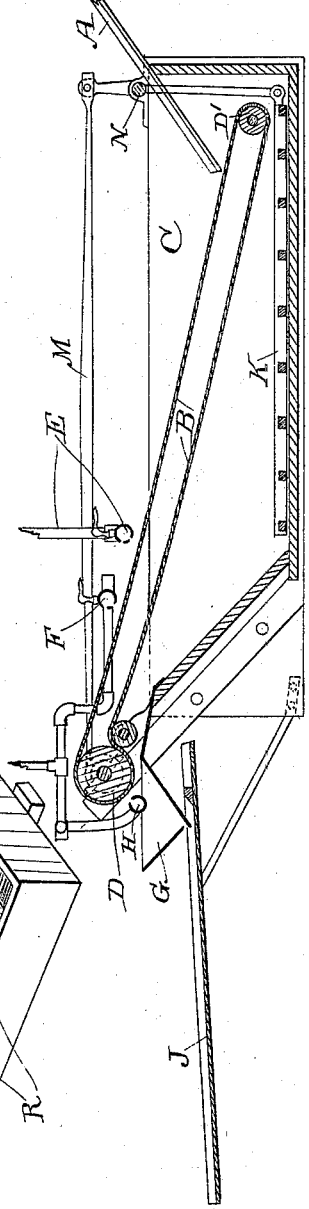
Witnesses,
Inventors,
James A. Bouk
Charles R. Bushnell
By Dewey & Co.
Atty

UNITED STATES PATENT OFFICE.

JAMES A. BOUK AND CHARLES R. BUSHNELL, OF SANTA CRUZ, CALIFORNIA.

DEVICE FOR SAVING VALUABLE AND PRECIOUS METALS.

SPECIFICATION forming part of Letters Patent No. 544,880, dated August 20, 1895.

Application filed January 18, 1895. Serial No. 535,418. (No model.)

*To all whom it may concern:*

Be it known that we, JAMES A. BOUK and CHARLES R. BUSHNELL, citizens of the United States, residing in Santa Cruz, Santa Cruz county, State of California, have invented an Improvement in Devices for Saving Valuable and Precious Metals; and we hereby declare the following to be a full, clear, and exact description of the same.

Our invention relates to an apparatus which is especially designed for saving the valuable and precious metals which are mostly lost in the ordinary processes for treating ores.

It consists in certain details of construction, which will be more fully explained by reference to the accompanying drawings, in which—

Figure 1 is a view of our apparatus. Fig. 2 is a longitudinal vertical section of the receiving-tank, belt, and connections.

The object of our invention is to save a portion of precious and valuable metals which are lost by passing over amalgamating-plates and concentrators, and which escape in the form of chlorides and fine float metal, as well as sulphurets too fine and light to readily settle, these being technically called "slimes." Arsenic and other base minerals are also contained in the water used in milling, and these foul the quicksilver and prevent amalgamation. The loss from these causes in milling refractory ores is very large, from one-fourth to three-fourths sometimes going to waste.

Our apparatus is designed to separate the water which is used during the crushing and pulverizing of the ore, as well as the fine sulphurets, float gold and silver, &c., from the heavier products, and to wash the heavier pulp free from arsenic and other impurities that prevent amalgamation, thus delivering the heavier pulp upon the amalgamating-plates and to the concentrators free from the arsenic and other impurities, and allowing the light material thus separated ample time to settle, so that it can be collected and saved while the water is eventually filtered and again used in connection with the pulverizing of fresh ore until it becomes so heavily charged with valuable soluble matter—such as soluble chlorides of silver and gold—that the latter can be profitably separated from it.

In our apparatus as illustrated, A is a spout through which the pulverized or crushed ore is delivered into a tank C, which contains water and which is kept constantly full, as will be hereinafter described.

B is an endless traveling belt, which passes over drums or rollers D D', the drum D being suitably journaled above one end of the tank, and the drum D' being submerged within the tank, so that the receiving end of the belt is situated below the surface of the water therein. The pulp passes down the delivery-spout, and when it first strikes the surface of the water in the tank the lighter slimes and soluble material are held in suspension within the water, while the heavier sulphurets, metal, and concentrates pass down the spout and are delivered upon the surface of the slowly-moving belt. This belt is caused to travel by any suitable power applied to the upper drum-shaft by means of a pulley $d$ or other suitable or well-known devices, and as the belt moves slowly up through the water in the tank the lighter portion of the slimes will be separated from the heavier material. As it emerges from the water in the tank, it is subjected to a fine spray of water from the spray-pipe E, which extends across above the belt. The water supplied to the pipe E comes from the elevated tank U, into which the filtered water from the apparatus has been pumped, and this water partially washes off the fine slimes and chlorides which still adhere to the coarser pulp. As the belt continues to move, it passes under a second spray-pipe F, which discharges fresh clean water from any suitable source of supply, and the pulp as well as the endless belt, is washed clean from the fine slimes, sulphurets, chlorides, and float gold and silver which may still adhere. These are all left in the tank C, and the pulp passing onward and upward over the driving-roller D it will drop into the hopper or receptacle G, which is situated beneath this end of the belt where it passes over the roller.

H is a jet-pipe extending across above the hopper and in proximity with the endless belt at this point, and it discharges clean fresh water against the belt, so as to wash off any particles which may adhere and thus cause them to drop into the hopper. This hopper has a discharge slot or openings in the bottom, and the pulp thus washed passes from the hopper upon an amalgamating-plate J, and thence to concentrators not here shown. The pulp, being freed by the previous operation from arsenic, manganese, and other base minerals contained in the slimes and which foul the quicksilver and obstruct the amalgamation and concentration, will be in condition to be properly treated upon the amalgamating-plates and in the concentrator in the usual manner.

Within the tank C and below the endless traveling belt is an agitator K, suitably constructed and adapted to reciprocate backward and forward or otherwise move in the lower part of the tank, so as to prevent the fine slime from settling and caking or becoming solid in the bottom of the tank. This agitator is here shown reciprocated by means of an arm or arms from a rock-shaft N, having the upwardly-projecting arm connected by a rod or pitman M with a crank L, which is fixed upon the shaft of the drum D and is revolved by it. At one side of the tank C and situated below the level of the bottom are a series of settling tanks or troughs Q. We have shown these troughs as being placed side by side in an essentially horizontal position, the adjacent two tanks being connected by overflow-passages R at the opposite end from which the material is received, so that the material will pass from one end to the other of each of the tanks until it has passed through the whole series. Near the bottom of the tank C is a discharge-passage and cock, as shown at O, so that the principal portion of the slimes and fine material is being constantly drawn from the tank C into the troughs Q.

P is an overflow from the top of the tank C, which also discharges into the first of the troughs Q, and thus maintains the water in the tank C at a constant height. The flow of the water and fine slimes through the settling-tanks Q is so slow that the body of the water within the tanks Q is practically in a quiet and nearly stationary condition, so that a principal portion of the material will settle within these tanks before arriving at the end of the last one. This last settling-tank has a discharge-opening, preferably in the bottom, and beneath this is a filter or filters S, through which the water passes and within which the remaining fine material, chlorides, &c., that are not in absolute solution will be retained. As the water which passes through the filter still contains a considerable amount of valuable material, it is pumped into an elevated tank U by means of a pump T, and this water is drawn from the tank U, as desired, to mix with the fresh ore in the pulverizing apparatus, and also to the pipe E, which delivers the spray of water upon the traveling belt. This water is thus used over and over, with such additions to it, by means of the fresh-water spray-pipe F, as may be needed to supply the waste which takes place by the absorption of a certain amount of water by the fresh ore which is constantly introduced. Whenever this water becomes heavily charged with soluble chlorides of silver and gold or with other mineral matter of sufficient value, it may be drawn off and the metal precipitated in any usual or well-known manner, or the water may be evaporated and a fresh supply substituted for use in the apparatus. The pure water added through the fine spray F is about what would be required to wet the dry ore which is being crushed, and the supply in the tank C is thus kept up to the required amount. Whenever the fine slimes have sufficiently accumulated within the settling-tanks Q, they are removed, and may then be treated in the usual manner for concentrates.

Having thus described our invention, what we claim as new, and desire to secure by Letters Patent, is—

An improved organized apparatus for saving valuable and precious metals consisting of a water containing tank, an endless traveling belt having one end submerged therein, with means for delivering the ore upon the submerged end of the belt, spray pipes delivering water upon the belt after it has emerged from the tank to cleanse the heavier portions and leave the slimes and soluble portions remaining within the tank, settling tanks, and connections whereby the solution and slimes are delivered directly and continuously from the main tank to the settlers, a filter whereby the insoluble portions are arrested within the settling tanks, and the solution allowed to pass therefrom, a pump, a tank into which the solution is elevated, and pipes whereby the solution is delivered both upon the endless traveling belt and also into the ore which is being delivered thereto whereby the solution is retained and circulated until sufficiently charged with soluble matter for further treatment.

In witness whereof we have hereunto set our hands.

JAMES A. BOUK.
CHARLES R. BUSHNELL.

Witnesses:
JOSEPH SKIRM,
CHARLES L. BOUK.